United States Patent [19]
Kaycee et al.

[11] Patent Number: 5,889,470
[45] Date of Patent: Mar. 30, 1999

[54] DIGITAL SUBSCRIBER LINE ACCESS DEVICE MANAGEMENT INFORMATION BASE

[75] Inventors: Manu Kaycee, Freehold, N.J.; David L. Arneson, Bow, N.H.; Gerard P. Lowry, Freehold, N.J.

[73] Assignee: Paradyne Corporation, Largo, Fla.

[21] Appl. No.: 812,624

[22] Filed: Mar. 7, 1997

Related U.S. Application Data

[60] Provisional application No. 60/034,441 Dec. 24, 1996.

[51] Int. Cl.[6] ............................ G05B 23/02; H04L 12/40
[52] U.S. Cl. ...................... 340/825.07; 370/438; 370/463
[58] Field of Search ....................... 340/825.07; 370/524, 370/359, 434, 463, 241, 250, 280, 347, 384, 438; 395/670, 600, 650, 700

[56] References Cited

U.S. PATENT DOCUMENTS 5,471,617  11/1995  Farrand et al. ......................... 395/670

*Primary Examiner*—Michael Horabik
*Assistant Examiner*—Jean B. Jeanglaude
*Attorney, Agent, or Firm*—Thomas, Kayden, Horstmeyer & Risley, L.L.P.

[57] ABSTRACT

A digital subscriber line (DSL) access device management information base (MIB) allows the remote management of a DSL access device by using a constructed enterprise DSL MIB to define a plurality of objects that describe the operation of a DSL access device. These objects are used to monitor the performance of, and if desired, send commands to the DSL access device. The enterprise DSL MIB of the present invention contains a first child group which contains selected ones of the plurality of objects which describe information specific to digital subscriber line access devices, a second child group containing selected ones of the plurality of objects which describe statistics specific to a digital subscriber line access device link, and a third child group containing selected ones of the plurality of objects which define IP (Internet Protocol) and MAC (Media Access Control) layer filter addresses corresponding to a specific digital subscriber line access device interface on a specific digital subscriber line access device module within a digital subscriber line access device. The enterprise DSL MIB of the present invention also includes a trap child group which describes the DSL access device uptime and downtime.

8 Claims, 4 Drawing Sheets

DIGITAL SUBSCRIBER LINE ACCESS DEVICE MANAGEMENT INFORMATION BASE

CROSS REFERENCE TO RELATED APPLICATION

This application claims priority to and the benefit of the filing date of copending provisional application entitled DIGITAL SUBSCRIBER LINE TRANSCEIVER MANAGEMENT INFORMATION BASE, assigned Ser. No. 60/034,441, and filed Dec. 24, 1996.

FIELD OF THE INVENTION

The present invention generally relates to communication system management, and more specifically to a management system which allows for querying a digital subscriber line (DSL) access device to collect object data, and an associated enterprise management information base (MIB) for storing object data in accordance with a specified MIB architecture.

BACKGROUND

The Internet community has defined an organizational framework of data, which provides a naming authority allowing any company or group to define information within the framework in a way that allows any or all of this data to coexist. Under the control of the International Telecommunications Union (ITU) and the International Standards Organization (ISO), the organizational framework has been constructed as a tree. The root of the tree is managed by the ITU and the ISO. Branches extending from the tree may be assigned to other organizations for defining the child branches for that branch. A MIB is a data base that describes a set of items that management applications and agents use to report and control managed devices. Management applications can include, but are not limited to configuration, discovery and topology managers. Management agents are the managed devices themselves. A DSL access device can be one of these managed devices.

A MIB begins with a line naming the MIB. The name of the MIB is followed by an import statement which allows the definition of other MIB's that may be incorporated into the MIB being defined. These import statements are typically called Requests for Comments (RFC's). Each RFC is assigned a unique number that identifies the document. For example, RFC1212 defines the formal grammar for a Simple Network Management Protocol (SNMP) MIB. SNMP is a widely used protocol that enables interoperable network management. The SNMP protocol defines a set of commands that a management application may use to retrieve or change the value of items that a management agent is making available.

Within the MIB is a structure for organizing managed items. The structure is formed by defining a group or groups of related pieces of information. A group is defined by naming it and showing how it fits into an inherence tree. Groups may contain information in the form of items or "objects", subgroups, or a combination of the two. Each subgroup is configured like a group.

Within a group, data can be organized in one of two methods. A scalar item is a single piece of information within a group. A table is a structure for organizing data that requires more information to uniquely identify a single data item within a group of similar items.

Each item, whether scalar or part of a table, defined in a MIB includes a description which defines the item. Typically, the description includes SYNTAX, ACCESS, STATUS and DESCRIPTION clauses. The SYNTAX clause specifies the type of information which the item contains. Information types typically specified by the SYNTAX clause include INTEGER, OCTET STRING, Counter and DisplayString. INTEGER specifies that the value of the item should be interpreted as a number. OCTET STRING specifies that the value of the item should be interpreted as a string of octets, each having a value between 0 and 255. Counter specifies that the item is an INTEGER that has an implied range of zero to FFFFFFFF. DisplayString specifies that the item is an OCTET STRING where each octet is restricted to a printable ASCII character.

The ACCESS clause specifies the ways the item may be used and shows the actions which the agent may support for the item. ACCESS may be read-only, read-write or not-accessible. Read-only means that the value of the item may be retrieved by a management application but may not be altered. Read-write means that the item may be read and/or altered by a management application. Not-accessible is given as the access for organizational constructs that do not represent data items. Not-accessible is used only for table features and should not be used for a scalar item. The STATUS clause specifies whether the item is required for an agent that supports the defined group. A STATUS of mandatory means that the item will always be present if the defined group is supported by the agent. A STATUS of optional means that a particular implementation has the optional of supporting the item. The DESCRIPTION clause contains a double quote delimited text description of the item. Finally, the item definition ends by specifying how the item fits into the MIB tree. The group the item belongs to is given, followed by the unique branch number within the group for the item.

To organize a table requires the use of two additional operators, the SEQUENCE operator and the SEQUENCE OF operator. The SEQUENCE operator allows the definition of a new type that consists of several standard types in a specific order. The SEQUENCE OF operator allows the definition of a list of zero or more of the same type of elements. A table is formed by defining a SEQUENCE, typically called a table entry. A table is defined as a SEQUENCE OF the table entry type. As there is no data that is uniquely referred to by the name of the table or entry, the STATUS of the table and the table entry is not-accessible. The INDEX clause specifies the items can be used to uniquely identify an element in the table.

A MIB may also contain trap definitions. A trap is a notification sent by the SNMP agent located within the managed device to a management station, or from the management station to a higher level manager. The trap includes specific information for use by the management application. The trap is sent to inform the management station about an event that has occurred on the managed system. The trap definition begins with the name of the trap, followed by the term TRAP-TYPE. An ENTERPRISE clause follows to indicate the MIB in which the trap is defined. An optional VARIABLES clause may also be included to specify additional information that will be sent in the trap. Typically, the additional information contained in the VARIABLES clause will be items defined in the MIB identified in the ENTERPRISE clause. A DESCRIPTION clause which explains the significance of the trap and the conditions that would cause it to be sent follows. Finally, the trap is given a number to identify it. The number will be unique within the scope of the ENTERPRISE. Both the enterprise name and the trap number are used by the management station to uniquely determine the identity of a received trap.

SUMMARY OF THE INVENTION

Briefly stated, the present invention is a method of managing at least one digital subscriber line (DSL) access device using a constructed management information base (MIB), wherein a plurality of objects describing the operation of one or more DSL access devices are collected and assembled into a MIB. The MIB is used to manage a DSL access device by monitoring the performance of, and if desired, sending control commands to the access device.

The enterprise DSL MIB of the present invention is further organized to contain a first child group which contains selected ones of the plurality of objects which describe information specific to digital subscriber line access devices, a second child group containing selected ones of the plurality of objects which describe statistics specific to a digital subscriber line access device link, and a third child group containing selected ones of the plurality of objects which define IP (Internet Protocol) and MAC (Media Access Control) layer filter addresses corresponding to a specific digital subscriber line access device interface on a specific digital subscriber line access device module within a digital subscriber line access device.

In addition, the MIB of the present invention also includes a traps child group which describes the DSL access device uptime and downtime.

The enterprise DSL MIB of the present invention operates within a management framework used to manage access networks based around DSL interfaces and devices that include DSL interfaces. The network typically includes DSL access devices, which allow end users to connect to the network. The network, for example, can be the Internet, a corporate network, or any other data communications network. A DSL access device can be either resident inside a personal computer (PC) or be a stand alone device connected to a user's PC via some communications interface, for example, an Ethernet connection.

DSL access devices connect across the local telephone loop by using physical and link level DSL protocols. One or more such DSL access device connects to a DSL access concentrator device, which resides within a telephone company's central office. The DSL access concentrator device multiplexes data from multiple DSL access devices, all of which may reside at different physical locations. One or more DSL access concentrator devices are connected to a network, which provides end user access to various networked services.

The enterprise DSL MIB structure resides on each DSL access concentrator device. In order to acquire DSL specific information, a management station exchanges SNMP messages with an SNMP agent on the corresponding DSL access concentrator device. The SNMP agent accesses the enterprise DSL MIB structure on behalf of the management station and performs applicable information gathering and control actions.

An advantage of the present invention is that it allows for the remote management and control of a plurality of digital subscriber line access devices.

Another advantage of the present invention is that it allows for the scaleable management and control of a plurality of digital subscriber line access devices by including information about the remote devices.

Another advantage of the present invention is that it allows DSL access devices to use management access protocols other than SNMP.

Another advantage of the present invention is that it allows both synchronous and asynchronous modes of operation.

Other features and advantages of the present invention will become apparent to one of skill in the art upon review of the following drawings and the detailed description of the preferred embodiment.

BRIEF DESCRIPTION OF THE DRAWINGS

The present invention can be better understood with reference to the following drawings. The drawings are not necessarily to scale, emphasis instead being placed on clearly illustrating principles of the present invention.

DETAILED DESCRIPTION OF THE PREFERRED EMBODIMENT

Figure 1:
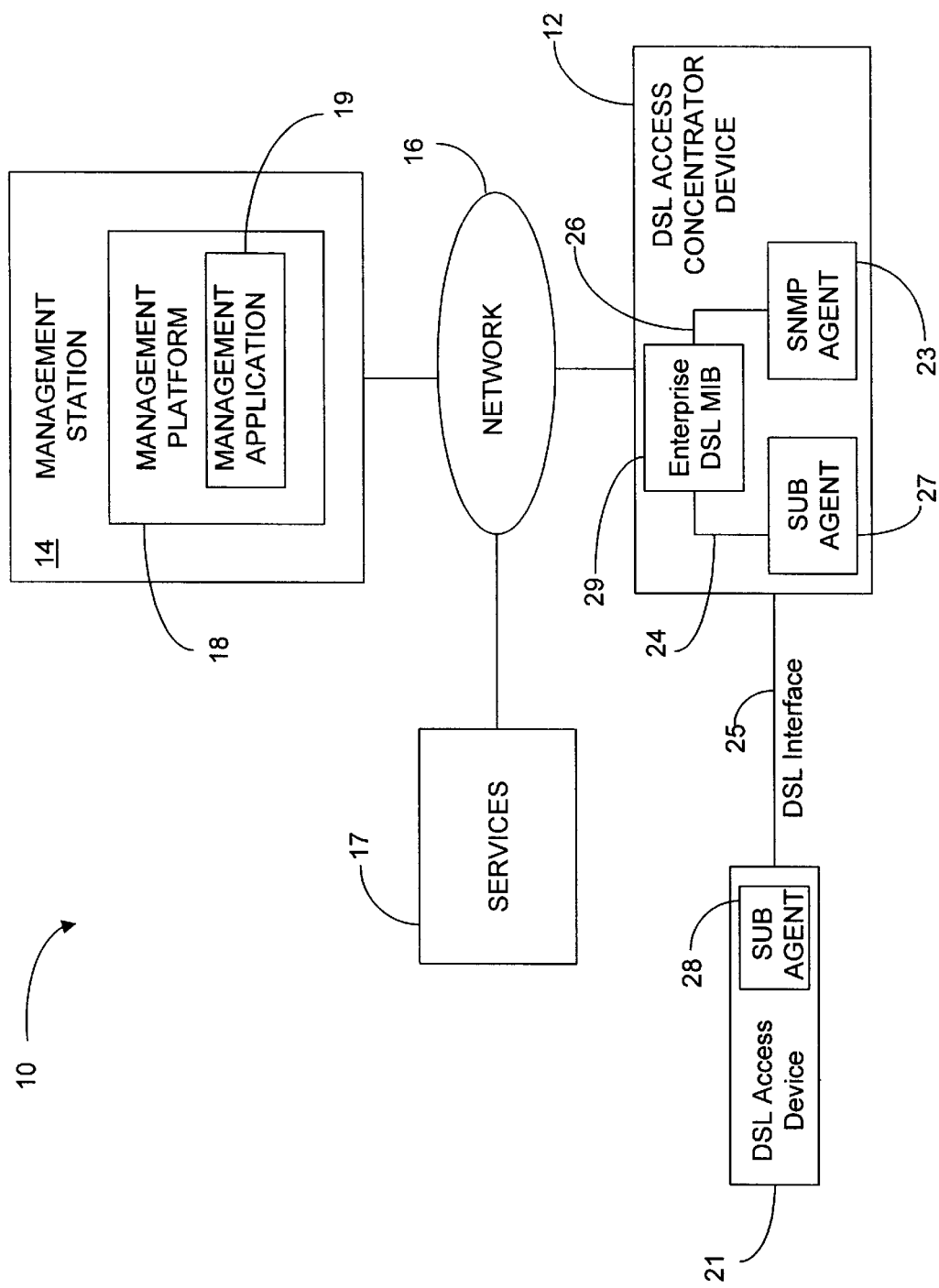
FIG. 1 is a block diagram illustrating a digital subscriber line access device and associated management system.

With reference now to the figures wherein like reference numerals designate corresponding parts throughout the several views, FIG. 1 is a block diagram illustrating the digital subscriber line access device and associated management system of the present invention. The management system 10 includes at least one digital subscriber line access device 21 to be managed by management station 14, through DSL access concentrator device 12. Management station 14 can be, for example but not limited to, a personal computer or a networked workstation. For simplicity, only one digital subscriber line access device will be shown and discussed, however, a plurality of DSL access devices can be managed using the enterprise DSL MIB of the present invention. DSL access device 21 can be managed by management station 14 over network 16. Network 16 can be, for example, an Ethernet or Token Ring type network, a local area network (LAN), a wide area network (WAN), or a collection of LAN's and WAN's.

Installed at management station 14 is software having a management platform 18 which runs a management application 19. Management platform 18 can be, for example, but not limited to, Microsoft Windows operating system. Once launched, the management application 19 performs specific management tasks by interacting with SNMP agent 23 located at DSL access concentrator device 12. Management application 19 and SNMP agent 23 communicate over network 16 using management application protocols within the TCP/IP protocol suite, preferably the Simple Network Protocol Management (SNMP). SNMP agent 23 collects information about DSL access device 21, that information used to form the enterprise DSL MIB of the present invention, and provides that information to a network administrator physically located at the management station 14. The management information provided to the network administrator can be used to monitor the performance of, and if desired, send control commands to DSL access concentrator device 12, which in turn can send control commands to remote DSL access device 21.

Connected to DSL access concentrator device 12 through DSL interface 25 is DSL access device 21. DSL access device 21 provides end user connectivity to the remote user location. For simplicity, only one DSL access device 21 is shown in FIG. 1, however any number of DSL access devices can be managed by the enterprise DSL MIB of the present invention. DSL access device 21, connected via DSL interface 25 allows high-speed, multi-service access to networked services 17. Furthermore, multiple DSL access concentrator devices 12 can reside at the same telephone company central office.

In order to facilitate commuications across DSL interface 25, each end of a DSL link maintains and processes information pertinent to the operation of DSL access device 21.

Residing on DSL access device 21 is sub agent 28, which is used to communicate with sub agent 27 located on DSL access concentrator device 12, in order to provide information about DSL access device 21 to management station 14.

DSL access concentrator device 12 can multiplex data from multiple DSL access devices 21, which can reside at different locations and typically provide end user connectivity to networked services 17.

Also resident on DSL access concentrator device 12 is enterprise DSL MIB 29 of the present invention. In order to acquire DSL specific information, management station 14 exchanges SNMP messages with SNMP agent 23 on DSL access concentrator device 12. SNMP agent 23 accesses enterprise DSL MIB 29 via line 26 in order to collect applicable information regarding the status and operation of DSL access device 21.

In order to facilitate access to network management information, enterprise DSL MIB 29 functions as an information aggregation point for DSL interface 25 and DSL access device 21.

The preferred embodiment of enterprise DSL MIB 29 of the present invention allows network management of DSL access devices in two modes of operation. In synchronous mode, management station 14 communicates with SNMP agent 23 on DSL access concentrator device 12, across network 16, indicating which DSL access device 21 or DSL interface 25 is to be accessed. SNMP agent 23 acquires information from enterprise DSL MIB 29. Alternatively, SNMP agent 23 uses sub agent 27 to contact a corresponding sub agent peer 28 located on DSL access device 21. In this manner, SNMP agent 23 acts as a proxy for a selected DSL access device 21, and is considered to be operating in synchronous mode.

In asynchronous mode, sub agent 28 on DSL access device 21 operates independently of SNMP agent 23. In this mode, SNMP agent 23 merely accesses enterprise DSL MIB 29, using the latest available information. Sub agent peer 28, based upon predefined policies internal to DSL access concentrator device 12, acquires information from DSL access device 21, and updates enterprise DSL MIB 29 via line 24. In this manner, SNMP agent 23 still acts as a proxy for a selected DSL access device 21, but the operation is considered to be asynchronous.

Although the foregoing specifies that the interaction of SNMP agent 23 and sub agent 27 occurs within DSL access concentrator device 12, such interaction is merely one embodiment. Because the enterprise DSL MIB 29 of the present invention is a virtual memory store, it may reside elsewhere within the network to provide additional management frameworks, for example, but not limited to a DSL access concentrator device acting as a proxy for one or more additional DSL access concentrator devices, or a foreign system acting as a proxy for one or more DSL access concentrator devices.

Figure 2:
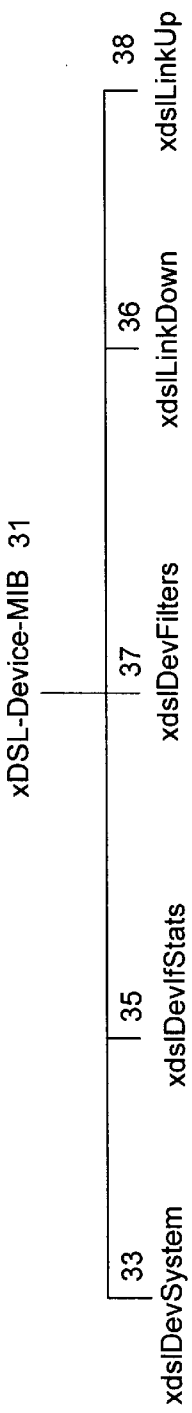
FIG. 2 is an inherence tree illustrating the organization of an enterprise MIB used with the digital subscriber line access device and associated management system of FIG. 1.

Referring now to FIG. 2, shown is a tree illustrating the organization of an enterprise DSL MIB entitled xdsl-Device-MIB 31, used with the digital subscriber line access device and associated management system of FIG. 1. Immediately following the title of the enterprise DSL MIB of the present invention is an IMPORTS statement that defines the other MIB's that are incorporated into the enterprise MIB of the present invention and is defined as follows:

```
IMPORTS
    Counter, enterprises
        FROM RFC115-SMI
    OBJECT-TYPE
        FROM RFC-1212
    TRAP-TYPE
        FROM RFC-1215;
```

The enterprise DSL MIB xdsl-Device-MIB 31 defines the set of manageable object instances and traps known to SNMP agent 23 of FIG. 1. Management application 19 uses the definition of object instances and traps of enterprise DSL MIB xdsl-Device-MIB 31 to manage DSL access device 21.

The enterprise DSL MIB, xdsl-Device-MIB 31, is organized to include a number of child groups, each child group describing a different aspect of the DSL access device. The child groups include an xdslDevSystem child group located at branch 33, an xdslDevIfStats child group located at branch 35, and an xdslDevFilters child group located at branch 37.

Still referring to FIG. 2, the traps child group is also illustrated. The xdslLinkDown object is located at branch 36 and the xdslLinkUp object is located at branch 38. The formal organization of the traps child group is as follows:

```
Trap definitions
xdslLinkDown TRAP-TYPE
    ENTERPRISE xdsl
    VARIABLES { xdslDevIfStatsIfIndex }
    DESCRIPTION
        "This trap signifies that the sending protocol entity recognizes
        a failure in one of the xDSL communication links represented in
        the agent's configuration."
    ::= 1
xdslLinkup TRAP-TYPE
    ENTERPRISE xdsl
    VARIABLES { xdslDevIfStatsIfIndex }
    DESCRIPTION
        "This trap signifies that the sending protocol entity recognizes
        that one of the xDSL communication links represented in the
        agent's configuration has come up."
    ::= 2
END
```

Figure 3:
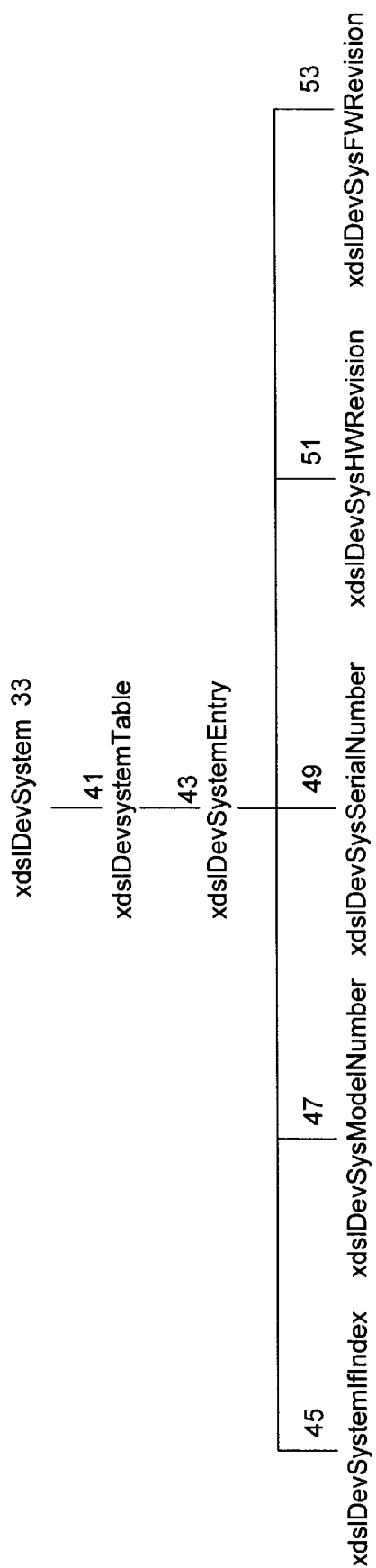
FIG. 3 is an inherence tree illustrating the DevSystem child group of the enterprise MIB of FIG. 2.

Referring now to FIG. 3, the xdslDevSystem child group located at branch 33 of enterprise DSL MIB xdsl-Device-MIB 31 of FIG. 2 will be discussed in greater detail.

The xdslDevSystem child group located at branch 33 is further defined by the xdslDevSystemTable object located at branch 41, the xdslDevSystemEntry object located at branch 43, the xdsldevSystemIfIndex object located at branch 45, the xdslDevSysModelNumber object located at branch 47, the xdslDevSysSerialNumber object located at branch 49, the xdslDevsysHWRevision object located at branch 51, and the xdslDevSysFWRevision object located at branch 53. The formal organization of the xdslDevSystem child group located at branch 33 is as follows:

```
The xdslDevSystem group
xdslDevSystemTable OBJECT-TYPE
    SYNTAX SEQUENCE OF XdslDevSystemEntry
    ACCESS not-accessible
    STATUS mandatory
    DESCRIPTION
        "The xdslDevSystemTable provides information specific to
        xDSL modules (or boards) within a xDSL device, or system.
        The table is indexed by an object which corresponds to ifIndex.
        These ifIndex entries, themselves, denote and identify specific
        modules by encoding identification information in corresponding
        ifDescription objects. As such, this table is sparse."
    ::= { xdslDevSystem 1 }
xdslDevSystemEntry OBJECT-TYPE
    SYNTAX XdslDevSystemEntry
    ACCESS not-accessible
    STATUS mandatory
    DESCRIPTION
        "Describes a specific xDSL module/board entry."
    INDEX { xdslDevSysIfIndex }
    ::= { xdslDevSystemTable 1 }
XdslDevSystemEntry ::=
    SEQUENCE {
        xdslDevSysIfIndex           INTEGER,
        xdslDevSysModelNumber       DisplayString,
        xdslDevSysSerialNumber      DisplayString,
        xdslDevSysHWRevision        OCTET STRING,
        xdslDevSysFWRevision        OCTET STRING
    }
xdslDevSysIfIndex OBJECT-TYPE
    SYNTAX INTEGER
    ACCESS read-only
    STATUS mandatory
    DESCRIPTION
        "The value of this object corresponds directly to each xDSL
        module specific interface as described in ifTable. The ifType
        of such interfaces, as present in the ifTable, shall be of
        type other(1)."
    ::= { xdslDevSystemEntry 1 }
xds1DevSysModelNumber    OBJECT-TYPE
    SYNTAX DisplayString(SIZE (16))
    ACCESS read only
    STATUS mandatory
    DESCRIPTION
        "The model number of the xDSL component of the
        specific device."
    ::= { xdslDevSystemEntry 2 }
xdslDevSysSerialNumber OBJECT-TYPE
    SYNTAX DisplayString (SIZE (16))
    ACCESS read-only
    STATUS mandatory
    DESCRIPTION
        "The serial number of the xDSL component of the specific
device."
    ::= { xdslDevSystemEntry 3 }
xdslDevSysHWRevision OBJECT-TYPE
    SYNTAX OCTET STRING (SIZE (4))
    ACCESS read-only
    STATUS mandatory
    DESCRIPTION
        "The hardware revision of the xDSL component of the specific
        device. The string has the following format: 'a.b.c.d'."
    ::= { xdslDevSystemEntry 4 }
xdslDevSysFWRevision OBJECT-TYPE
    SYNTAX OCTET STRING (SIZE (4))
    ACCESS read-only
    STATUS mandatory
    DESCRIPTION
        "The firmware revision of the xDSL component of the specific
        device. The string has the following format: 'a.b.c.d', where
        'a' specifies the type of code (Development, Alpha Test, Beta
        Test, Released)."
    ::= { xdslDevSystemEntry 5 }
```

Figure 4:
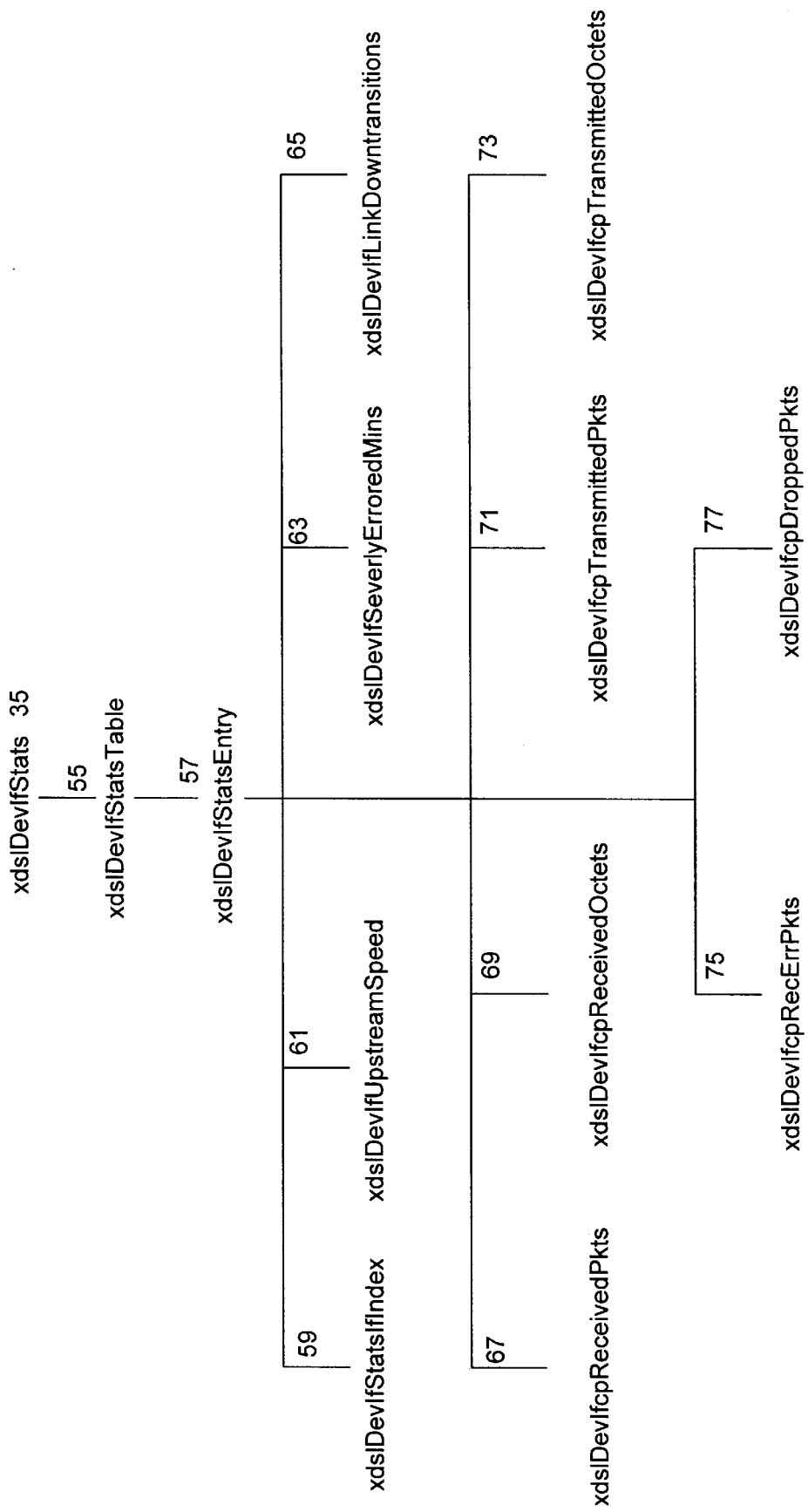
FIG. 4 is an inherence tree illustrating the DevIfStats child group of the enterprise MIB of FIG. 2.

Referring now to FIG. 4, the xdslDevIfStats child group located at branch 35 of enterprise DSL MIB xdsl-Device-MIB 31 of FIG. 2 will be discussed in greater detail.

The xdslDevIfStats child group located at branch 35 is further defined by the xdslDevIfStatsTable object located at branch 55, the xdslDevIfStatsEntry object located at branch 57, the xdslDevIfStatsIfIndex object located at branch 59, the xdsIDevIfUpStreamSpeed object located at branch 61, the xdslDevIfSeverlyErroredMins object located at branch 63, the xdslDevIfLinkDownTransitions object located at branch 65, the xdslDevIfcpReceivedPkts object located at branch 67, the xdslDevIfcpReceivedOctets object located at branch 69, the xdslDevIfcpTransmittedPkts object located at branch 71, the xdsldevIfcpTransmittedOctets object located at branch 73, the xdslDevIfcpRecErrPkts object located at branch 75, and the xdslDevlfcpDroppedPkts object located at branch77. The formal organization of the xdslDevIfStats child group located at branch 35 is as follows:

```
The xdslDevIfStats group
xdslDevIfStatsTable OBJECT-TYPE
    SYNTAX SEQUENCE OF XdslDevIfStatsEntry
    ACCESS not accessible
    STATUS mandatory
    DESCRIPTION
        "The xdslIfStatsTable provides statistics specific to the xDSL
        link.
        Interface statistics are specific to the corresponding interface
        at the customer premise. Generally, the value of these
statistics
        should be equal to those that correspond to the central office
        end of the xDSL link. However, they may vary depending upon
        the quality and conditions of the link.
        The table is indexed by an object which corresponds to ifIndex.
        However, there is only an entry in this table for each octet-
        based xDSL link. As such, this table is sparse and follows the
        behavior of the xDSL links within the ifTable.
        Furthermore, this table does not include, nor reference, ifTable
        interface entries that corresponding to, and are used to encode,
        xDSL devices."
    ::= { xdslDevIfStats 1 }
xdslDevIfStatsEntry OBJECT-TYPE
    SYNTAX XdslDevIfStatsEntry
    ACCESS not-accessible
    STATUS mandatory
    DESCRIPTION
        "Describes a specific xDSL statistics entry."
    INDEX { xdslDevIfStatsIfIndex }
    ::= {xdslDevIfStatsTable 1 }
XdslDevIfStatsEntry ::=
    SEQUENCE {
        xdslDevIfStatsIfIndex              INTEGER,
        xdslDevIfUpStreamSpeed             INTEGER,
        xdslDevIfSeveralyErroredMins       Counter,
        xdslDevIfLinkDownTransitions       Counter,
        xdslDevIfcpReceivedPkts            Counter,
        xdslDevIfcpReceivedOctets          Counter,
        xdslDevIfcpTransmittedPkts         Counter,
        xdslDevIfcpTransmittedPkts         Counter,
        xdslDevIfcpReceivedPkts            Counter,
        xdslDevIfcpDroppedPkts             Counter,
    }
xdslDevIfStatsIfIndex OBJECT-TYPE
    SYNTAX INTEGER
    ACCESS read only
    STATUS mandatory
    DESCRIPTION
        "The value of this object corresponds directly to each octet-
        based DSL interface as described in ifTable."
    ::= { xdslDevIfStatsEntry 1 }
xdslDevIfUpStreamSpeed OBJECT-TYPE
    SYNTAX INTEGER
    ACCESS read-only
    STATUS mandatory
    DESCRIPTION
        "In the case of ADSL, the upstream speed (to the central office)
        may be different from the downstream speed (to the customer).
        In this case, the ifSpeed object for the interface will reflect the
        downstream speed of the link. This object will reflect the
upstream
        speed.
        If the link is not asymmetric in nature, then the value of this
```

-continued

```
        object will be the same ifSpeed for the corresponding
interface
            entry in the ifTable."
    ::= { xdslDevIfStatsEntry 2 }
xdslDevIfSeverelyErroredMins OBJECT-TYPE
    SYNTAX Counter
    ACCESS read-only
    STATUS mandatory
    DESCRIPTION
        "The number of error conditions that resulted in a severe error
        state. This includes conditions that results in a reset of the
        xDSL link or 10 or more error conditions in the most recent.
        last minute."
    ::= { xdslDevIfStatsEntry 3 }
xdslDevIfLinkDownTransitions OBJECT-TYPE
    SYNTAX Counter
    ACCESS read-only
    STATUS mandatory
    DESCRIPTION
        "Reflects the number of times that the xDSL link has gone to a
        down state. This may be due to shutting down of the
customers side
        of the link. It could also be due to error conditions which
result
        in the going down. A large number of these per unit time
        (synchronized off sysUpTime) would be indicative of an error
        condition."
    ::= { xdslDevIfStatsEntry 4 }
xdslDevIfcpReceivedPkts OBJECT-TYPE
    SYNTAX Counter
    ACCESS read-only
    STATUS mandatory
    DESCRIPTION
        "The number of good packets that have been received by
        the xDSL device at the customer premise."
    ::= { xdslDevIfStatsEntry 5 }
xdslDevIfcpReceivedOctets OBJECT-TYPE
    SYNTAX Counter
    ACCESS read-only
    STATUS mandatory
    DESCRIPTION
        "The number of octets that have been received by the
        xDSL device at the customer premise."
    ::= { xdslDevIfStatsEntry 6 }
xdslDevIfcpTransmittedPkts OBJECT-TYPE
    SYNTAX Counter
    ACCESS read-only
    STATUS mandatory
    DESCRIPTION
        "The number of good packets that have been transmitted by
the xDSL
        device at the customer premise."
    ::= { xdslDevIfStatsEntry 7 }
xdslDevIfcpTransmittedPkts OBJECT-TYPE
    SYNTAX Counter
    ACCESS read-only
    STATUS mandatory
    DESCRIPTION
        "The number of octets that have been transmitted by the
xDSL device
        at the customer premise."
    ::= { xdslDevIfStatsEntry 8 }
xdslDevIfcpReceivedPkts OBJECT-TYPE
    SYNTAX Counter
    ACCESS read-only
    STATUS mandatory
    DESCRIPTION
        "Reflects the number packet receive with error by the xDSL
device
        at the customer premise."
    ::= { xdslDevIfStatsEntry 9 }
xdslDevIfcpDroppedPkts OBJECT-TYPE
    SYNTAX Counter
    ACCESS read-only
    STATUS mandatory
    DESCRIPTION
        "Reflects the number of good packets that have been
received by the
        xDSL device at the customer premised, but have been dropped
due to
            insufficient buffer capacity."
    ::= { xdslDevIfStatsEntry 10 }
```

Figure 5:
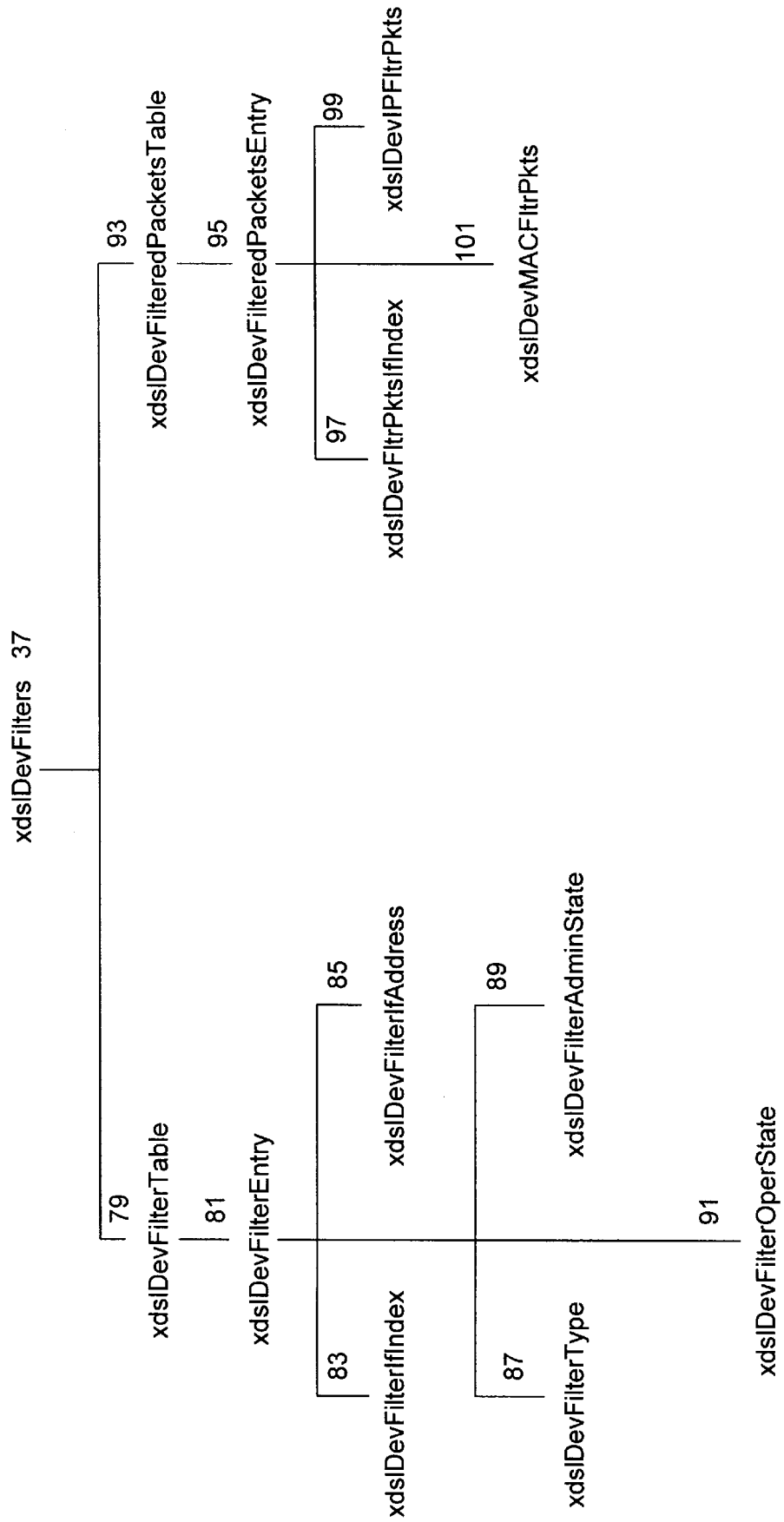
FIG. 5 is an inherence tree illustrating the DevFilters child group of the enterprise MIB of FIG. 2.

Referring now to FIG. 5, the xdslDevFilters child group located at branch 37 of enterprise DSL MIB xdsl-Device-MIB 31 of FIG. 2 will be discussed in greater detail.

The xdslDevFilter child group located at branch 37 is further defined by the xdslDevFilterTable object located at branch 79, the xdslDevFilterEntry object located at branch 81, the xdslDevFilterIfIndex object located at branch 83, the xdslDevFilterAddress object located at branch 85, the xdslDevFilterType object located at branch 87, the xdsldev-FilterAdminState object located at branch 89, and the xdslDevFilterOperState object located at branch 91. In addition, the xdslDevFilters child group is further defined by the xdslDevFilteredPacketsTable object located at branch 93, the xdslDevFilteredPacketsEntry object located at branch 95, the xdslDevFltrPktsIfIndex object located at branch 97, the xdslDevIPFltrPkts object located at branch 99, and the xdslDevMACFltrPkts object located at branch 101. The formal organization of the xdslDevFilter child group located at branch 37 is as follows:

```
The xdslDevFilter group
xdslDevFilterTable OBJECT-TYPE
    SYNTAX SEQUENCE OF XdslDevFilterEntry
    ACCESS not-accessible
    STATUS mandatory
    DESCRIPTION
        "This table defines IP and MAC-layer filter addresses
corresponding
        to specific xDSL interfaces on specific xDSL modules
        (or boards) within a xDSL device, or system. Also defined is
        the number of filtered packets corresponding to each entry.
        The table is doubly-indexed by an object which corresponds to
        ifIndex and the filter address itself. Each entry
corresponds to an
        octet-based xDSL link. As such, this table is sparse and
follows the
        behavior of the xDSL links within the ifTable.
        There exists a conceptual for each IP and MAC address
filter which
        has been defined. A conceptual row if created by setting the
        xdslDevFilterType object for a specific address. At some
later time
        the filter can be enabled. If at least one entry
corresponding to
        a specific interface is enabled, then that interface is set to
        filtering mode.
        The set operation will fail if the type is not supported by the
        device."
    ::= { xdslDevFilter 1 }
xdslDevFilterEntry OBJECT-TYPE
    SYNTAX XdslDevFilterEntry
    ACCESS not-accessible
    STATUS mandatory
    DESCRIPTION
        "Describes a specific filter entry."
    INDEX { xdslDevIfStatsIfIndex, xdslDevFilterTable }
    ::= { xdslDevFilterTable 1 }
XdslDevFilterEntry ::=
    SEQUENCE {
        xdslDevIfStatsIfIndex      INTEGER,
        xdslDevFilterTable         OCTET STRING,
        xdslDevFilterType                 INTEGER,
        xdslDevFilterAdminState    INTEGER,
        xdslDevFilterOperState     INTEGER
    }
xdslDevIfStatsIfIndex OBJECT-TYPE
    SYNTAX INTEGER
    ACCESS read-only
```

```
            STATUS mandatory
            DESCRIPTION
                "The value of this object corresponds directly to each octet-
                based DSL interface as described in ifTable."
        ::= { xdslDevFilterEntry 1 }
    xdslDevIfStatsIfIndex OBJECT-TYPE
            SYNTAX OCTET STRING (SIZE (4..6))
            ACCESS read-only
            STATUS mandatory
            DESCRIPTION
                "The address that will be used to specify and define the filter.
                The entry octects are expected to be in either canonical or
                network byte order."
        ::= { xdslDevFilterEntry 2 }
    xdslDevFilterType OBJECT-TYPE
            SYNTAX INTEGER {
                macFilter(1),
                ipFilter(2)
            }
            ACCESS read-write
            STATUS mandatory
            DESCRIPTION
                "Defines the type of address this filter applies to.
                Once a type has been assigned to a filter entry it is illegal to
                change the value of this object, since a change to the type
would
                imply a change to the address."
        ::= { xdslDevFilterEntry 3 }
    xdslDevFilterAdminState OBJECT-TYPE
            SYNTAX INTEGER {
                enable(1),
                disable(2),
                delete(3)
            }
            ACCESS read-write
            STATUS mandatory
            DESCRIPTION
                "Defines the desired stat e of the interface. Values include:
                    enable(1)    - enables the filter entry.
                    disable(2)   - disables the filter entry, but
                                   leaves it available for future
                                   use.
                    delete(3)    - Removes the filter entry."
            DEFVAL { disable }
        ::= { xdslDevFilterEntry 4 }
    xdslDevFilterOperState OBJECT-TYPE
            SYNTAX INTEGER {
                enable(1),
                disable(2),
                excessEntry(3)
            }
            ACCESS read-only
            STATUS mandatory
            DESCRIPTION
                "The operational state of this filter entry. Values include:
                    enable(1)    - the filter entry is enabled
                                   and is functional.
                    disable(2)   - the entry has been established,
                                   but is currently not being
                                   used.
                    deleting(3)  - the entry has been marked for
                                   deletion."
        ::= { xdslDevFilterEntry 5 }
    xdslDevFilteredPacketsTable OBJECT-TYPE
            SYNTAX SEQUENCE OF XdslDevFilteredPacketsEntry
            ACCESS not-accessible
            STATUS mandatory
            DESCRIPTION
                "This table provides filtering information specific to xDSL
                modules (or boards) within a xDSL device, or system.
                The table is indexed by an object which corresponds to ifIndex.
                These ifIndex entries, themselves, denote and identify specific
                modules by encoding identification information in corresponding
                ifDescription objects. As such, this table is sparse."
        ::= { xdslDevFilter 2 }
    xdslDevFilteredPacketsEntry OBJECT-TYPE
            SYNTAX XdslDevFilteredPacketsEntry
            ACCESS not-accessible
            STATUS mandatory
            DESCRIPTION
                "Describes a specific entry (conceptual row) for filtered
packets."
            INDEX { xdslDevFltrPktsIfIndex }
        ::= { xdslDevFilteredPacketsTable 1 }
    xdslDevFilteredPacketsEntry ::=
            SEQUENCE {
                xdslDevFltrPktsIfIndex       INTEGER,
                xdslDevIPFltrPkts            Counter,
                xdslDevMACFltrPkts           Counter
            }
    xdslDevFltrPktsIfIndex OBJECT-TYPE
            SYNTAX INTEGER
            ACCESS read-only
            STATUS mandatory
            DESCRIPTION
                "The value of this object corresponds directly to each xDSL
                module specific interface as described in ifTable. The ifType
                of such interfaces, as present in the ifTable, shall be of
                type other(1)."
        ::= { xdslDevFilteredPacketsEntry 1 }
    xdslDevIPFltrPkts OBJECT-TYPE
            SYNTAX Counter
            ACCESS read-apply
            STATUS mandatory
            DESCRIPTION
                "The number of IP packets that have been filtered due to not
                matching programmed filter entries on interfaces that are
                activated for IP filtering."
        ::= { xdslDevFilteredPacketsEntry 2 }
    xdslDevMACFltrPkts      OBJECT-TYPE
            SYNTAX Counter
            ACCESS read-only
            STATUS mandatory
            DESCRIPTION
                "The number of MAC packets that have been filtered due to not
                matching programmed filter entries on interfaces that are
                activated for MAC filtering."
        ::= { xdslDevFilteredPacketsEntry 3 }
```

The elements of the enterprise DSL MIB, as described previously, can be implemented in software, firmware, hardware, or a combination thereof.

When implemented in software, the enterprise MIB can be stored and transported on any computer readable medium for use by or in connection with a computer-related system or method. In the context of this document, a computer readable medium is an electronic, magnetic, optical, or other physical device or means that can contain or store a computer program for use by or in connection with a computer-related system or method.

Thus, there has been described and illustrated herein a DSL access device management system and MIB which provides significantly enhanced capabilities in managing a DSL access device.

It is to be understood that the foregoing is descriptive of an illustrative, preferred embodiment of the invention. Numerous variations or changes may occur to those skilled in the art without departure from the spirit and scope of the invention.

The following is claimed:

1. A method of managing, using a management application running on a management station, at least one digital subscriber line access device using a constructed management information base, the method comprising the steps of:

collecting a plurality of objects describing said at least one digital subscriber line access device, said plurality of objects including objects describing a digital subscriber line system, objects describing the statistics of a digital subscriber line link, and objects describing filter addresses corresponding to said digital subscriber line access device;

assembling said plurality of objects describing said at least one digital subscriber line access device into a management information base (MIB); and managing said at least one digital subscriber line access device from said management station using said assembled MIB by monitoring performance of said at least one digital subscriber line access device.

2. The method of claim 1, wherein said at least one digital subscriber line access device has a software management agent installed therein to interface with said management station and wherein the step of assembling said plurality of objects describing said at least one digital subscriber line access device into a MIB further comprises the step of organizing said MIB into three child groups.

3. The method of claim 2, wherein said objects describing a digital subscriber line system contain selected ones of said plurality of objects describing said at least one digital subscriber line access device which describe information specific to digital subscriber line access device modules.

4. The method of claim 2, wherein said objects describing the statistics of a digital subscriber line link contain selected ones of said plurality of objects describing said at least one digital subscriber line access device which describe statistics specific to a digital subscriber line access device link.

5. The method of claim 2, wherein said objects describing filter addresses corresponding to said digital subscriber line access device contain selected ones of said plurality of objects describing said at least one digital subscriber line access device which define IP and MAC-layer filter addresses corresponding to a specific digital subscriber line access device interface on a specific digital subscriber line access device module within said digital subscriber line access device.

6. The method of claim 2, wherein said MIB includes a trap child group which contains selected ones of said plurality of objects describing said at least one digital subscriber line access device which describe a digital subscriber line uptime and downtime.

7. A management information base (MIB) which uses a management application program running on a management station, for managing at least one digital subscriber line access device, the MIB comprising:

a plurality of objects describing said at least one digital subscriber line access device, said plurality of objects including objects describing a digital subscriber line system, objects describing the statistics of a digital subscriber line link, and objects describing filter addresses corresponding to said digital subscriber line access device;

means for assembling said plurality of objects describing said at least one digital subscriber line access device into a management information base (MIB); and means for managing said at least one digital subscriber line access device from said management station using said assembled MIB by monitoring performance of said at least one digital subscriber line access device.

8. A computer readable medium having a program, which uses a management application program running on a management station, for managing at least one digital subscriber line access device, the program comprising:

a plurality of objects describing said at least one digital subscriber line access device, said plurality of objects including objects describing a digital subscriber line system, objects describing the statistics of a digital subscriber line link, and objects describing filter addresses corresponding to said digital subscriber line access device;

means for assembling said plurality of objects describing said at least one digital subscriber line access device into a management information base (MIB); and means for managing said at least one digital subscriber line access device from said management station using said assembled MIB by monitoring performance of said at least one digital subscriber line access device.

* * * * *

UNITED STATES PATENT AND TRADEMARK OFFICE
CERTIFICATE OF CORRECTION

PATENT NO. : 5,889,470

DATED : March 30, 1999

INVENTOR(S) : Manu Kaycee, et al.

It is certified that error appears in the above-identified patent and that said Letters Patent is hereby corrected as shown below:

Column 2, line 27, change "optional" to --option--.

Signed and Sealed this

Eighth Day of June, 1999

Q. TODD DICKINSON

*Attest:*

*Attesting Officer*        Acting Commissioner of Patents and Trademarks